US012675673B2

(12) United States Patent
Shibata

(10) Patent No.: US 12,675,673 B2
(45) Date of Patent: Jul. 7, 2026

(54) MULTIDIMENSIONAL DATA PROCESSING DEVICE, METHOD, AND COMPUTER-READABLE RECORDING MEDIUM

(71) Applicant: NEC Corporation, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 857 days.

(21) Appl. No.: 17/925,882

(22) PCT Filed: May 25, 2020

(86) PCT No.: PCT/JP2020/020567
§ 371 (c)(1),
(2) Date: Nov. 17, 2022

(87) PCT Pub. No.: WO2021/240607
PCT Pub. Date: Dec. 2, 2021

(65) Prior Publication Data
US 2023/0196077 A1    Jun. 22, 2023

(51) Int. Cl.
*G06N 3/0464*        (2023.01)
*G06N 3/048*        (2023.01)

(52) U.S. Cl.
CPC ........... *G06N 3/0464* (2023.01); *G06N 3/048* (2023.01)

(58) Field of Classification Search
CPC ....... G06N 3/0464; G06N 3/048; G06F 17/10
See application file for complete search history.

(56) References Cited

U.S. PATENT DOCUMENTS

2019/0041961 A1*  2/2019  Desai ..................... G06N 3/045
2021/0089807 A1*  3/2021  Liu ........................ G06V 10/82

OTHER PUBLICATIONS

Iandola, Forrest N., et al. "SqueezeNet: AlexNet-level accuracy with 50× fewer parameters and< 0.5 MB model size." arXiv preprint arXiv:1602.07360 (2016). (Year: 2016).*
Sakthi, Raj. "Talented Mr. 1×1: Comprehensive look at 1×1 Convolution in Deep Learning." (2020). (Year: 2020).*
(Continued)

*Primary Examiner* — Miranda M Huang
*Assistant Examiner* — Sidney Vincent Bostwick
(74) *Attorney, Agent, or Firm* — Sughrue Mion, PLLC

(57)        ABSTRACT

The 1 dimensional data generation means 92 generates 1 dimensional data, by setting the number of elements of each dimension other than predetermined one dimension to 1 based on multidimensional data corresponding to one input data. The number of elements reducing means 93 reduces the number of elements included in the 1 dimensional data. The copy means 95 generates multidimensional data, by copying the 1 dimensional data whose number of elements has been reduced multiple times. The convolution layer processing means 96 performs a convolution layer process with a filter size of 1×1 on the multidimensional data generated by the copy means 95. The element-wise product operation means 98 performs an element-wise product operation, based on the multidimensional data corresponding to one input data and multidimensional data generated by the above process.

8 Claims, 12 Drawing Sheets

(56) References Cited

OTHER PUBLICATIONS

Roy, Abhijit Guha, Nassir Navab, and Christian Wachinger. "Recalibrating fully convolutional networks with spatial and channel " squeeze and excitation" blocks." IEEE transactions on medical imaging 38.2 (2018): 540-549. (Year: 2018).*

Aflalo, Yonathan, et al. "Knapsack pruning with inner distillation." arXiv preprint arXiv:2002.08258 (2020). (Year: 2020).*

Hu, Jie, Li Shen, and Gang Sun. "Squeeze-and-excitation networks." Proceedings of the IEEE conference on computer vision and pattern recognition. 2018. (Year: 2018).*

International Search Report for PCT Application No. PCT/JP2020/020567, mailed on Aug. 11.2020.

Jie Hu. Li Shen, Samuel Albanie, Gang Sun, Enhua Wu, "Squeeze-and-Excitation Networks", [online], [retrieved Apr. 3, 2020), Internet < URL : https://arxiv.org/pdf/1709.01507.pdf>.

Qilong WANG et al., "ECA-Net: Efficient Channel Attention for Deep Convolutional Neural Networks". arXiv. org [online], arXiv:1910. 0315vl, Cornell University, 2019, [retrieved on Jul. 21, 2020]. Internet <URL:https://arxiv.org/pdf/1910.03151v1.pdf>, Abstract, Introduction, Related Work, Proposed Method.

* cited by examiner

PRE-CONVOLUTION DATA

H DIMENSION
(H)

W DIMENSION
(W)

C DIMENSION
(A)

FIG. 5

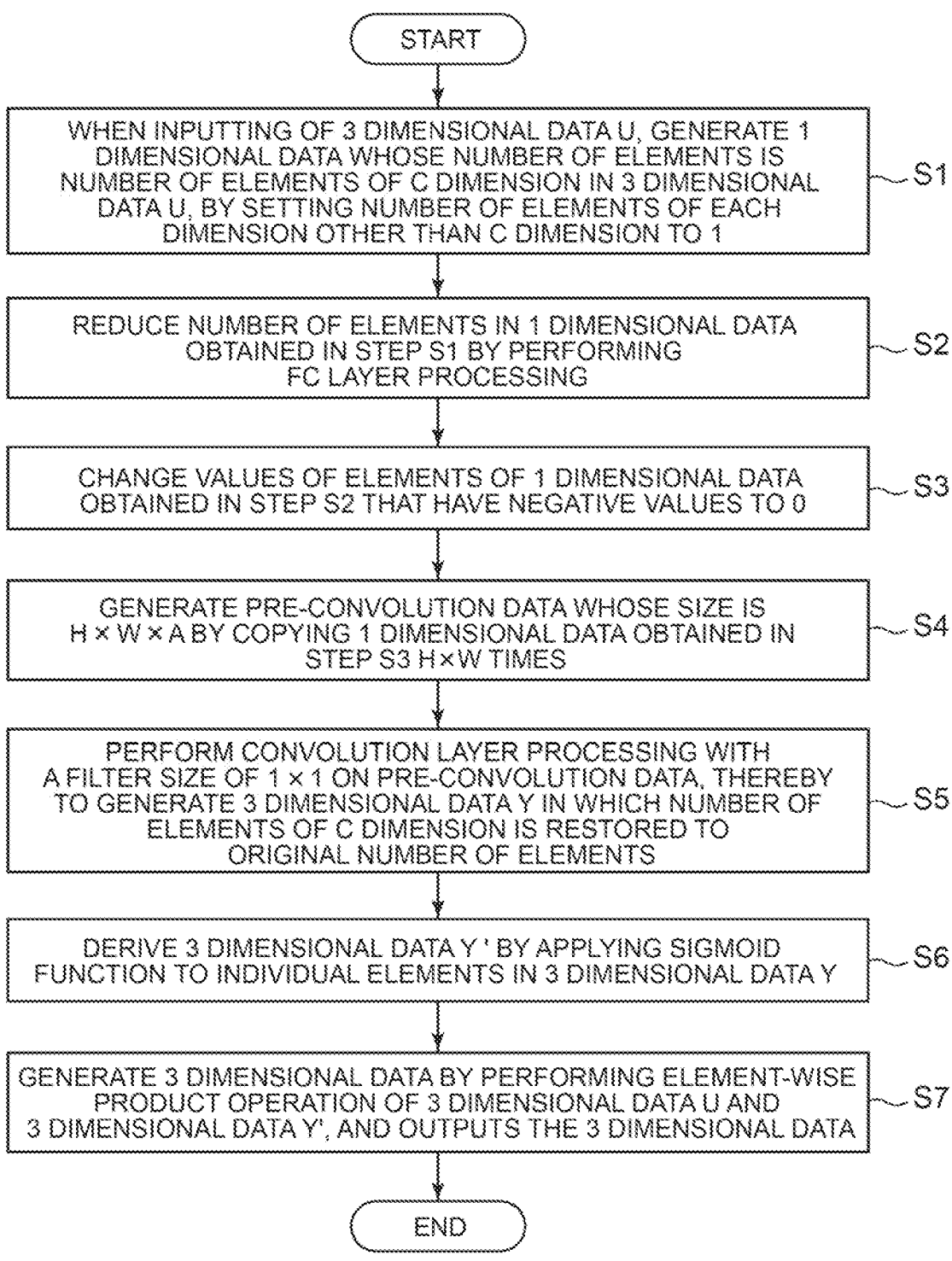

START

WHEN INPUTTING OF 3 DIMENSIONAL DATA U, GENERATE 1 DIMENSIONAL DATA WHOSE NUMBER OF ELEMENTS IS NUMBER OF ELEMENTS OF C DIMENSION IN 3 DIMENSIONAL DATA U, BY SETTING NUMBER OF ELEMENTS OF EACH DIMENSION OTHER THAN C DIMENSION TO 1 — S1

REDUCE NUMBER OF ELEMENTS IN 1 DIMENSIONAL DATA OBTAINED IN STEP S1 BY PERFORMING FC LAYER PROCESSING — S2

CHANGE VALUES OF ELEMENTS OF 1 DIMENSIONAL DATA OBTAINED IN STEP S2 THAT HAVE NEGATIVE VALUES TO 0 — S3

GENERATE PRE-CONVOLUTION DATA WHOSE SIZE IS H × W × A BY COPYING 1 DIMENSIONAL DATA OBTAINED IN STEP S3 H×W TIMES — S4

PERFORM CONVOLUTION LAYER PROCESSING WITH A FILTER SIZE OF 1 × 1 ON PRE-CONVOLUTION DATA, THEREBY TO GENERATE 3 DIMENSIONAL DATA Y IN WHICH NUMBER OF ELEMENTS OF C DIMENSION IS RESTORED TO ORIGINAL NUMBER OF ELEMENTS — S5

DERIVE 3 DIMENSIONAL DATA Y ' BY APPLYING SIGMOID FUNCTION TO INDIVIDUAL ELEMENTS IN 3 DIMENSIONAL DATA Y — S6

GENERATE 3 DIMENSIONAL DATA BY PERFORMING ELEMENT-WISE PRODUCT OPERATION OF 3 DIMENSIONAL DATA U AND 3 DIMENSIONAL DATA Y', AND OUTPUTS THE 3 DIMENSIONAL DATA — S7

END

1000

1001

CPU

AUXILIARY MEMORY          MAIN MEMORY          INTERFACE 1003                              1002                         1004

| 1 DIMENSIONAL DATA GENERATION MEANS | ~ 92 |

| NUMBER OF ELEMENTS REDUCING MEANS | ~ 93 |

| COPY MEANS | ~ 95 |

| CONVOLUTION LAYER PROCESSING MEANS | ~ 96 |

| ELEMENT-WISE PRODUCT OPERATION MEANS | ~ 98 |

3 DIMENSIONAL DATA U

Global Pooling LAYER — S101

FC LAYER — S102

ReLU LAYER — S103

FC LAYER — S104

Sigmoid LAYER — S105

Scale LAYER — S106

3 DIMENSIONAL DATA U

1×1×C

1×1×A

INPUT                    OUTPUT

3 DIMENSIONAL DATA X'

MULTIDIMENSIONAL DATA PROCESSING DEVICE, METHOD, AND COMPUTER-READABLE RECORDING MEDIUM

This application is a National Stage Entry of PCT/JP2020/020567 filed on May 25, 2020, the contents of all of which are incorporated herein by reference, in their entirety.

TECHNICAL FIELD

The present invention relates to a neural network processing device and a neural network processing method that perform a process of a neural network, and a computer-readable recording medium recording a neural network processing program.

BACKGROUND ART

In a neural network, a block is a batch of multiple layers which are basic components.

NPL 1 describes a SE (Squeeze-and-Excitation) block, as a block that improves the accuracy of CNN (Convolutional Neural Network). FIG. 8 is a schematic diagram showing the SE block described in NPL 1. NPL 1 shows the case where 3 dimensional data U is input to the SE block. FIG. 9 is a schematic diagram showing the 3 dimensional data U input to the SE block.

The individual dimensions in the 3 dimensional data are referred to as the H dimension, the W dimension, and the C dimension. The H dimension is, for example, the dimension related to the height of an image. The W dimension is, for example, the dimension related to the width of the image. The C dimension is the dimension related to the channel. It is assumed that the number of elements of the H dimension in the 3 dimensional data U is H. It is assumed that the number of elements of the W dimension in the 3 dimensional data U is W. It is assumed that the number of elements of the C dimension in the 3 dimensional data U is C. The size of the 3 dimensional data U can be expressed as H×W×C.

In the Global Pooling layer (step S101), the number of elements of the H dimension and the W dimension are respectively 1. The number of elements of the C dimension remains unchanged at C. In other words, based on the 3 dimensional data U whose size is H×W×C, 1 dimensional data whose size is 1×1×C is generated. FIG. 10 is a schematic diagram showing the 1 dimensional data obtained in the Global Pooling layer.

In the first FC (Fully Connected) layer (step S102), the number of elements in the 1 dimensional data obtained in the Global Pooling layer is reduced. FIG. 11 is a schematic diagram showing the 1 dimensional data obtained in the FC layer. Here, the number of elements after the reduction is A. A<C.

FIG. 12 is a schematic diagram showing the process in the first FC layer (step S102). In the first FC layer (step S102), the number of elements that are outputs is less than the number of elements that are inputs. Then, the elements that are inputs and the elements that are outputs are fully connected as shown in FIG. 12, and weights are determined for respective individual connections. When the number of elements that are inputs is C and the number of elements that are outputs is A, the number of weights is C×A. Each weight is determined in advance by learning. The value of an element that is an output is calculated based on the values of the individual elements that are inputs connected with the element and the weights determined for each pair of the element that is an output and the individual element that is an input. By finding the values of the A elements that are outputs, 1 dimensional data (see FIG. 11) whose number of elements is A is obtained.

In the ReLU (Rectified Linear Unit) layer (Step S103), among the elements in the 1 dimensional data obtained in the FC layer (Step S102), the values of elements with negative values are changed to 0. The values of elements with values equal to or greater than 0 are not changed. In the ReLU layer, the number of elements in 1 dimensional data remains unchanged at A.

In the second FC layer (step S104), the number of elements in the 1 dimensional data obtained in the ReLU layer is increased back to the original number of elements (C elements).

FIG. 13 is a schematic diagram showing the process in the second FC layer (step S104). In the second FC layer (step S104), the number of elements that are outputs is greater than the number of elements that are inputs. Then, the elements that are inputs and the elements that are outputs are fully connected as shown in FIG. 13, and weights are determined for respective individual connections. When the number of elements that are inputs is A and the number of elements that are outputs is C, the number of weights is A×C. Each weight is determined in advance by learning. The value of an element that is an output is calculated based on the values of the individual elements that are inputs connected with the element and the weights determined for each pair of the element that is an output and the individual element that is an input. By finding the values of the C elements that are outputs, 1 dimensional data whose number of elements is C is obtained.

The first FC layer and the second FC layer differ only in whether the number of elements that are outputs decreases or increases with respect to the number of elements that are inputs; the essential process is the same.

In the Sigmoid layer (step S105), the sigmoid function is applied to each element in the 1 dimensional data obtained in the second FC layer. In the Sigmoid layer, the number of elements in the 1 dimensional data remains unchanged at C.

Individual elements in the 1 dimensional data obtained by the Sigmoid layer are used as coefficients representing the degree of importance of the channel corresponding to the individual element. For example, the 0th element in the 1 dimensional data is the coefficient representing the degree of importance of the 0th channel.

In the Scale layer (step S106), the elements of each channel of the first input 3 dimensional data U (see FIG. 9) are multiplied by a coefficient indicating the degree of importance of that channel. At this time, by copying the 1 dimensional data obtained in the Sigmoid layer H×W times, 3 dimensional data whose size is H×W×C is generated. This 3 dimensional data is denoted by a symbol X'. Since the size of the 1 dimensional data obtained in the Sigmoid layer is 1×1×C, by copying this 1 dimensional data H×W times, 3 dimensional data X' with size H×W×C is obtained. FIG. 14 is a schematic diagram showing the 3 dimensional data X' obtained by copying the 1 dimensional data of size 1×1×C, H×W times. FIG. 15 is a schematic diagram showing calculation of element-wise product of the 3 dimensional data U and the 3 dimensional data X'. The sizes of both the 3 dimensional data U and the 3 dimensional data X' are H×W×C and are common. Furthermore, the elements in the 3 dimensional data U and the elements in the 3 dimensional data X' can both be specified by 3 dimension coordinates. Therefore, it is possible to associate elements in the 3 dimensional data U and elements in the 3 dimensional data X' that share the same 3 dimension coordinates. As a result, the elements in the 3 dimensional data U and the elements in the 3 dimensional data X' are associated one-to-one. By calculating the product of the values of elements for each pair of elements to be associated, new 3 dimensional data whose size is H×W×C is obtained. This 3 dimensional data is the result of the element-wise product of the 3 dimensional data U and the 3 dimensional data X', and is the output of the Scale layer. The 3 dimensional data obtained by this element-wise product operation can be said to be the data obtained by multiplying the multiple elements for each individual channel of the 3 dimensional data U by the coefficient corresponding to the channel (coefficient representing the degree of importance).

The output of the Scale layer (element-wise product of the 3 dimensional data U and the 3 dimensional data X') is also the output of the SE block.

CITATION LIST

Non Patent Literature

NPL 1: Jie Hu, Li Shen, Samuel Albanie, Gang Sun, Enhua Wu, "Squeeze-and-Excitation Networks", [online], [retrieved Apr. 3, 2020], Internet<URL: https://arxiv.org/pdf/1709.01507.pdf>

SUMMARY OF INVENTION

Technical Problem

The SE block can improve the accuracy of CNN. However, the SE block can significantly reduce processing speed.

Therefore, it is the object of the present invention to provide a neural network processing device, a neural network processing method, and a computer-readable recording medium recording a neural network processing program that can obtain the same CNN accuracy as the SE block and perform operations faster than the SE block.

Solution to Problem

A neural network processing device according to the present invention includes: 1 dimensional data generation means for generating, by setting the number of elements of each dimension other than predetermined one dimension to 1 based on multidimensional data corresponding to one input data, 1 dimensional data whose number of elements is the same as the number of elements of the predetermined one dimension in the multidimensional data; number of elements reducing means for reducing the number of elements included in the 1 dimensional data; copy means for copying the 1 dimensional data whose number of elements has been reduced multiple times, thereby to generate multidimensional data in which the number of elements of each dimension other than the predetermined one dimension is restored to original number of elements; convolution layer processing means for performing a convolution layer process with a filter size of 1×1 on the multidimensional data generated by the copy means, thereby to generate multidimensional data in which the number of element of the predetermined one dimension in multidimensional data generated by the copy means is restored to original number of elements; and element-wise product operation means for performing an element-wise product operation, based on the multidimensional data corresponding to one input data and the multidimensional data generated by the convolution layer processing means.

A neural network processing method according to the present invention includes: generating, by setting the number of elements of each dimension other than predetermined one dimension to 1 based on multidimensional data corresponding to one input data, 1 dimensional data whose number of elements is the same as the number of elements of the predetermined one dimension in the multidimensional data; reducing the number of elements included in the 1 dimensional data; executing a copy process of copying the 1 dimensional data whose number of elements has been reduced multiple times, thereby to generate multidimensional data in which the number of elements of each dimension other than the predetermined one dimension is restored to original number of elements; performing a convolution layer process with a filter size of 1×1 on the multidimensional data generated by the copy process, thereby to generate multidimensional data in which the number of element of the predetermined one dimension in multidimensional data generated by the copy process is restored to original number of elements;

and performing an element-wise product operation, based on the multidimensional data corresponding to one input data and the multidimensional data whose number of element of the predetermined one dimension is restored to original number of elements.

A computer-readable recording medium according to the present invention is a computer-readable recording medium in which a neural network processing program is recorded, wherein the neural network processing program causes a computer to execute: a 1 dimensional data generation process of generating, by setting the number of elements of each dimension other than predetermined one dimension to 1 based on multidimensional data corresponding to one input data, 1 dimensional data whose number of elements is the same as the number of elements of the predetermined one dimension in the multidimensional data; a number of elements reducing process of reducing the number of elements included in the 1 dimensional data; a copy process of copying the 1 dimensional data whose number of elements has been reduced multiple times, thereby to generate multidimensional data in which the number of elements of each dimension other than the predetermined one dimension is restored to original number of elements; a multidimensional data generation process of performing a convolution layer process with a filter size of 1×1 on the multidimensional data generated by the copy process, thereby to generate multidimensional data in which the number of element of the predetermined one dimension in multidimensional data generated by the copy process is restored to original number of elements; and an element-wise product operation process of performing an element-wise product operation, based on the multidimensional data corresponding to one input data and the multidimensional data generated by the multidimensional data generation process.

ADVANTAGEOUS EFFECTS OF INVENTION

According to this invention, it is possible to obtain the same CNN accuracy as the SE block and perform operations faster than the SE block.

BRIEF DESCRIPTION OF DRAWINGS

FIG. 5 It depicts a flowchart showing an example of the processing flow of the example embodiment of the present invention.

DESCRIPTION OF EMBODIMENTS

As mentioned above, the SE block can improve the accuracy of CNN. However, the SE block can significantly reduce processing speed.

The inventor of the present invention considered the following reasons for the reduced processing speed when SE block is used.

Figure 14:
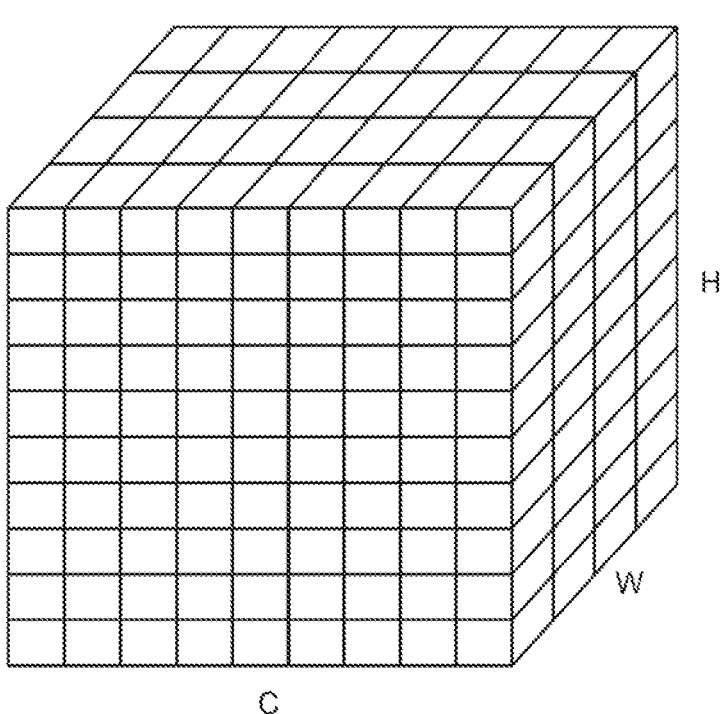
FIG. 14 It depicts a schematic diagram showing the 3 dimensional data X' obtained by copying the 1 dimensional data of size 1×1×C, H×W times.
Figure 15:
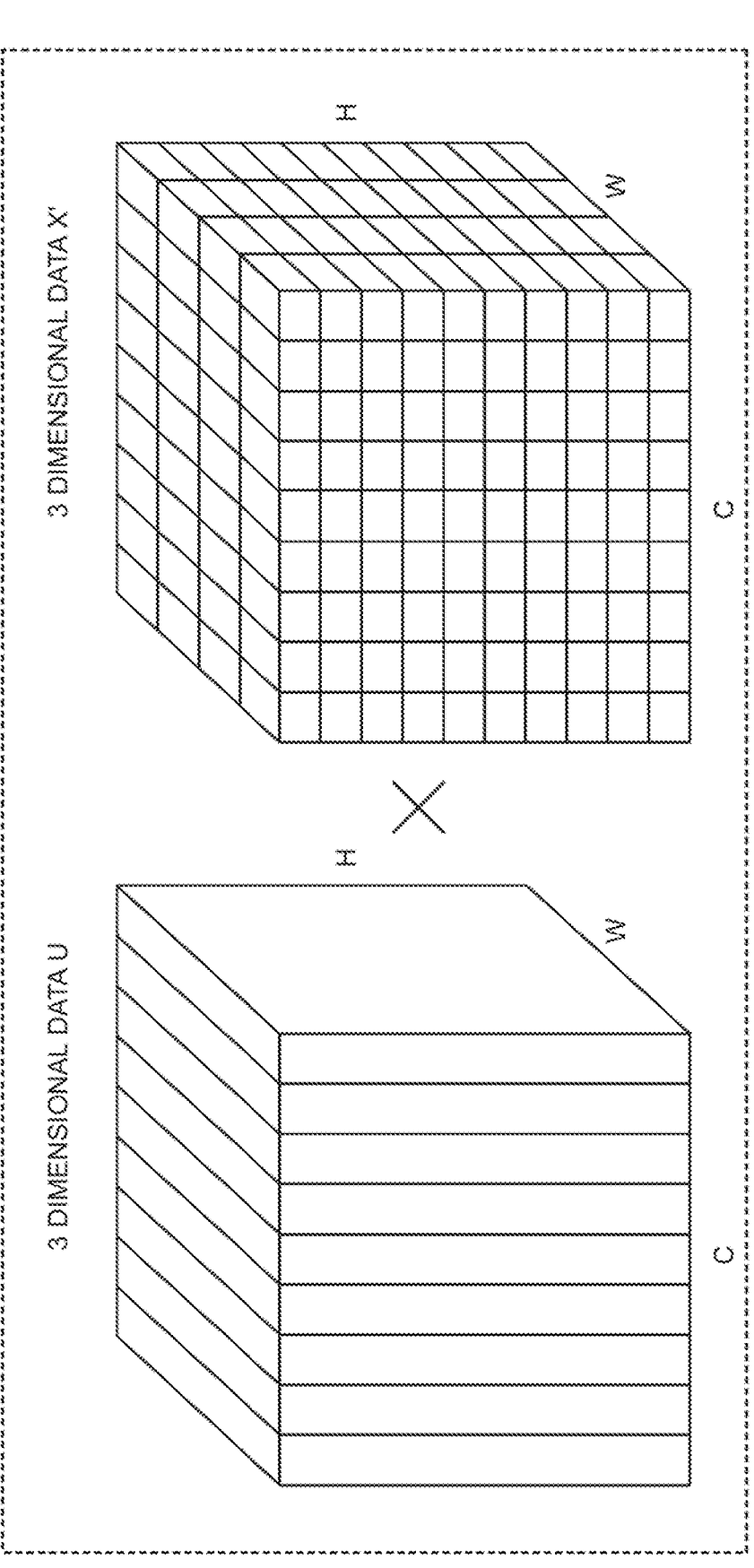
FIG. 15 It depicts a schematic diagram showing calculation of element-wise product of the 3 dimensional data U and the 3 dimensional data X'.

As mentioned above, in the SE block, in the Scale layer, the 1 dimensional data whose size is 1×1×C is copied H×W times to obtain the 3 dimensional data X' (see FIG. 14) whose size is H×W×C. This H×W times copy process causes a large overhead.

In particular, when the number of elements in the 1 dimensional data is large (in other words, when the value of C is large), the number of times an element is read from a memory and written to memory becomes enormous, and therefore the overhead of H×W times copy process is also enormous. For example, it is assumed that the size of the 1 dimensional data obtained in the Sigmoid layer is 1×1×1024 (i.e. C=1024). It is assumed that the size of the 3 dimensional data U is 7×7×1024. In other words, H=7 and W=7. In this case, for each of the 1024 elements in the 1 dimensional data, the read and write processes must be performed 7×7=49 times, resulting in a very large overhead due to the copy process.

The inventor of the present invention considered that the large overhead caused by this copy process was the cause of the slow processing speed in the SE block. Based on this consideration, the inventor made the following invention.

Example embodiment of the present invention is described below with reference to the drawings.

Multidimensional data is input to the neural network processing device of the example embodiment of the present invention. One multidimensional data corresponds to one input data. In order to make the invention easier to understand, the case in which the multidimensional data corresponding to one input data is 3 dimensional data will be used as an example in the present example embodiment. Even if the multidimensional data is other than 3 dimensional data, the same processing as in the following example embodiment can be applied.

Figures 9, 10, 11:
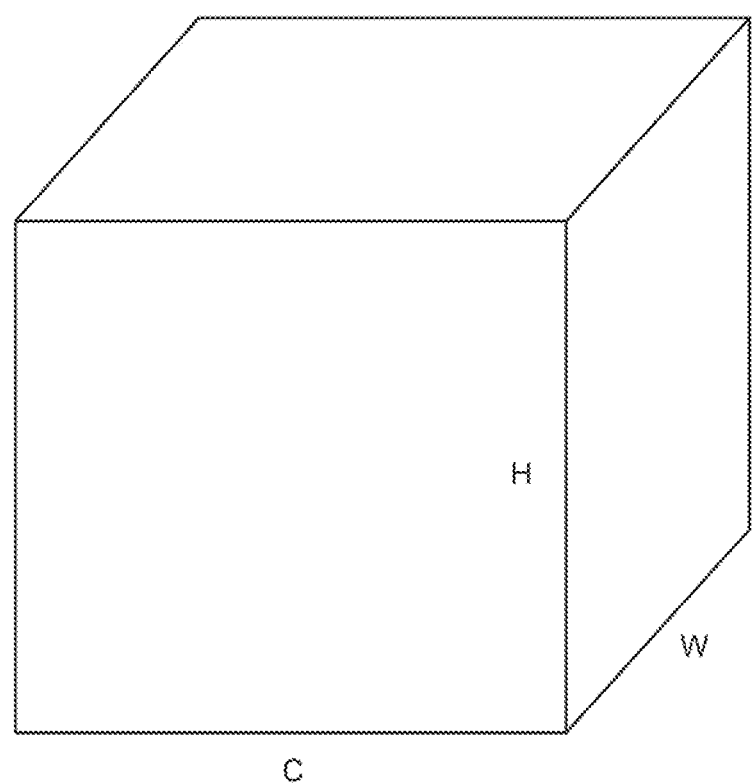
FIG. 9 It depicts a schematic diagram showing the 3 dimensional data U.
FIG. 10 It depicts a schematic diagram showing the 1 dimensional data obtained in the Global Pooling layer.
FIG. 11 It depicts a schematic diagram showing the 1 dimensional data obtained in the FC layer in the SE block.

The multidimensional data (3 dimensional data in the present example embodiment) input to the neural network processing device in the present example embodiment is denoted by the symbol U. As in the previous case, the individual dimensions in the 3 dimensional data U will be referred to as the H dimension, the W dimension, and the C dimension. The H dimension is, for example, the dimension related to the height of an image. The W dimension is, for example, the dimension related to the width of the image. The C dimension is the dimension related to the channel. It is assumed that the number of elements of the H dimension in the 3 dimensional data U is H. It is assumed that the number of elements of the W dimension in the 3 dimensional data U is W. It is assumed that the number of elements of the C dimension in the 3 dimensional data U is C. The size of the 3 dimensional data U can be expressed as H×W×C. The 3 dimensional data U can be represented schematically as shown in FIG. 9.

Figure 1:
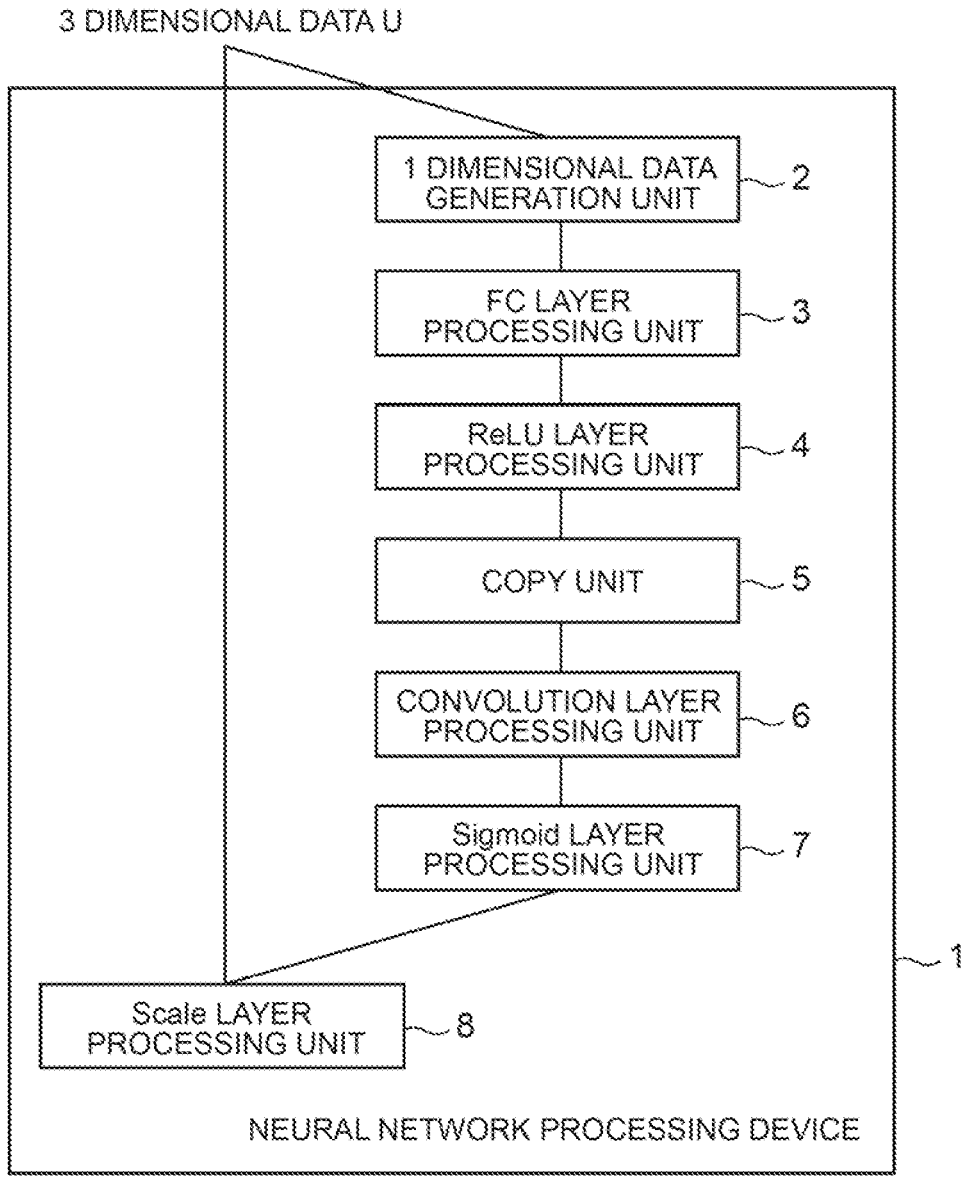
FIG. 1 It depicts a block diagram showing an example configuration of a neural network processing device of the example embodiment of the present invention.

FIG. 1 is a block diagram showing an example configuration of a neural network processing device of the example embodiment of the present invention. A neural network processing device 1 of the present example embodiment includes a 1 dimensional data generation unit 2, a FC layer processing unit 3, a ReLU layer processing unit 4, a copy unit 5, a convolution layer processing unit 6, a Sigmoid layer processing unit 7, and a Scale layer processing unit 8.

The 3 dimensional data U corresponding to one input data is input to the 1 dimensional data generation unit 2. Then, the 1 dimensional data generation unit 2, by setting the number of elements of each dimension other than the predetermined one dimension among the three dimensions (H dimension, W dimension, and C dimension) to 1, generates 1 dimensional data whose number of elements is the same as the number of elements of the predetermined one dimension in the 3 dimensional data U.

In the present example embodiment, it is assumed that the above predetermined one dimension is the "C dimension". In this case, the 1 dimensional data generation unit 2 sets the number of elements of each dimension other than the C dimension (H dimension and W dimension) to 1, thereby generates the 1 dimensional data whose number of elements is the same as the number of elements of the C dimension (i.e., C elements) in the 3 dimensional data U. The size of this 1 dimensional data is 1×1×C. The 1 dimensional data generated by the 1 dimensional data generation unit 2 can be represented schematically as shown in FIG. 10.

The 1 dimensional data generation unit 2 may, for example, generate 1 dimensional data by performing the same process as the Global Pooling layer. For example, the 1 dimensional data generation unit 2 may obtain the average value (which may be the maximum value) of the H×w elements in the 0th channel of the 3 dimensional data U, and determine the value as the value of the 0th element in the 1 dimensional data. The 1 dimensional data generation unit 2 performs the same process for each channel after the first, and determines the value of the element corresponding to each channel. As a result, C elements from the 0th to the C-1st are obtained, and 1 dimensional data with those elements is obtained. In this process, the 1 dimensional data generation unit 2 sets the number of elements of the H dimension and the number of elements of the W dimension to 1. The size of the 1 dimensional data obtained in this process is 1×1×C. The number of elements of the H dimension and the number of elements of the W dimension are both 1. Here, a case in which the 1 dimensional data generation unit 2 generates 1 dimensional data by performing the same process as it of the Global Pooling layer is described, but the 1 dimensional data generation unit 2 may generate 1 dimensional data whose size is 1×1×C by other methods.

The FC layer processing unit 3 reduces the number of elements in 1 dimensional data by performing FC layer processing on the 1 dimensional data obtained by 1 dimensional data generation unit 2. As in the previous case, the number of elements after the reduction is A. A<C.

Figure 8:
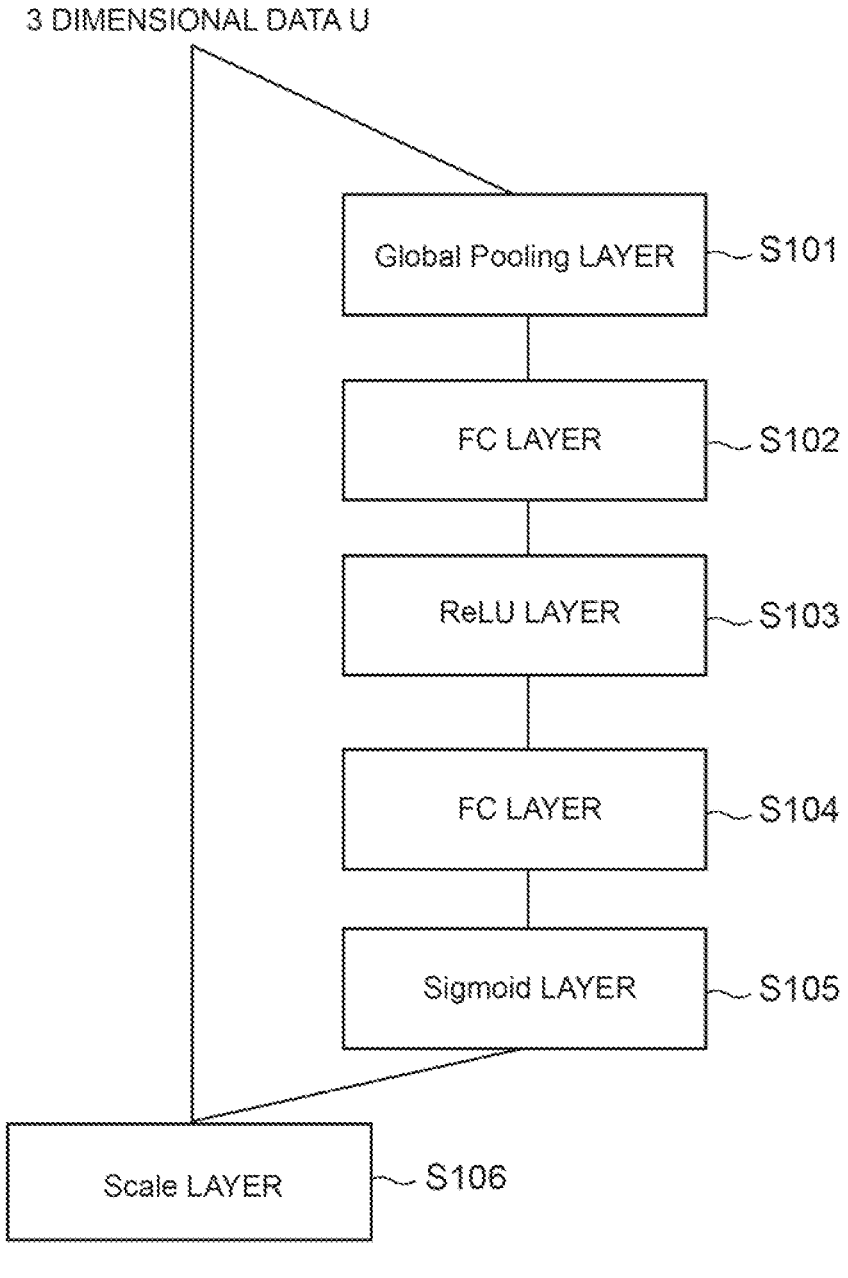
FIG. 8 It depicts a schematic diagram showing the SE block.
Figure 12:
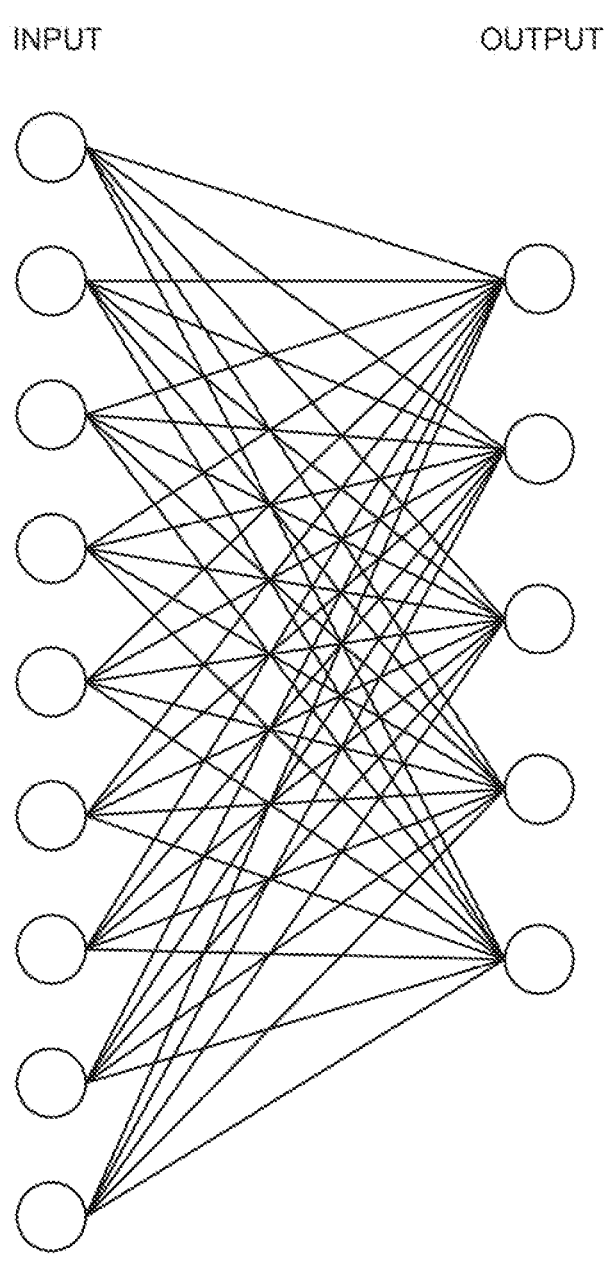
FIG. 12 It depicts a schematic diagram showing the process in the first FC layer in the SE block.
Figure 13:
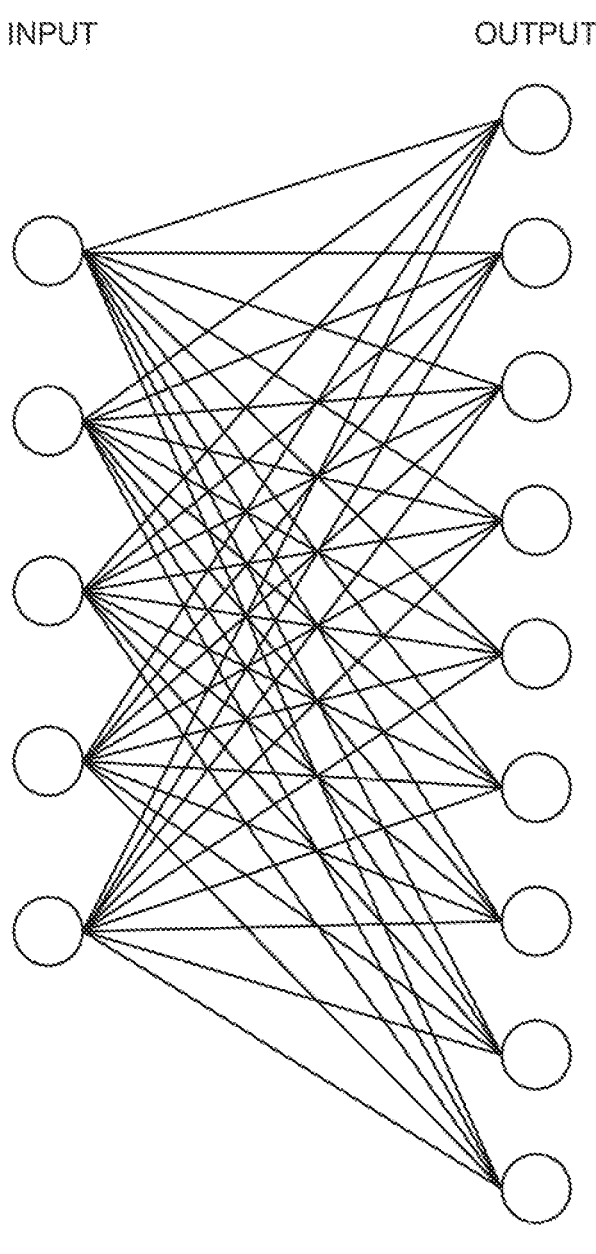
FIG. 13 It depicts a schematic diagram showing the process in the second FC layer in the SE block.

The processing of FC layer processing unit 3 is the same as the processing of the first FC layer of the SE block (step S102 in FIG. 8). That is, the FC layer processing unit 3 takes the C elements in the 1 dimensional data obtained by 1 dimensional data generation unit 2 as the elements that are inputs. In addition, the FC layer processing unit 3 takes the A elements after the number of elements is reduced as the elements that are outputs. The elements that are inputs and the elements that are outputs are fully connected as shown in FIG. 12, and the weights of each connection are determined in advance by learning. In this case, C×A weights have been determined by learning in advance. The FC layer processing unit 3 calculates one element in A elements based on the values of each element of C and the weights determined for each pair of the one element and each of C elements. The FC layer processing unit 3 calculates values of each of A elements, to derive the 1 dimensional data whose number of elements is A. The size of this 1 dimensional data is 1×1×A. The 1 dimensional data derived by the FC layer processing unit 3 can be schematically represented as shown in FIG. 11.

It could be said that the FC layer processing unit 3 performs a process to reduce the number of elements in the 1 dimensional data.

The ReLU layer processing unit 4 changes the values of the elements in the 1 dimensional data derived by the FC layer processing unit 3 that have negative values to 0. The ReLU layer processing unit 4 does not change the values of the elements whose values are equal to or greater than 0. The number of elements in the 1 dimensional data remains unchanged at A by the process of the ReLU layer processing unit 4. The ReLU layer processing unit 4 may not be included in the neural network processing device 1, and the above processing by the ReLU layer processing unit 4 may be omitted. Also, instead of the ReLU layer processing unit 4, a component that applies an arbitrary activation function to 1 dimensional data may be included in the neural network processing device 1.

The copy unit 5 copies the 1 dimensional data after processing by ReLU layer processing unit 4 multiple times (more specifically, H×W times) to generate multidimensional data in which the number of elements of each dimension other than the predetermined one dimension (C dimension) is restored to the original number of elements. Here, the "original number of elements" is the number of elements in the input multidimensional data (3 dimensional data U in the present example embodiment). In other words, by copying 1 dimensional data whose size is 1×1×A, H×W times, the copy unit 5 generates 3 dimensional data in which the number of elements of the H dimension is H, the number of elements of the W dimension is W, and the number of elements of the C dimension is A. The size of this 3 dimensional data is H×W×A.

Figure 2:
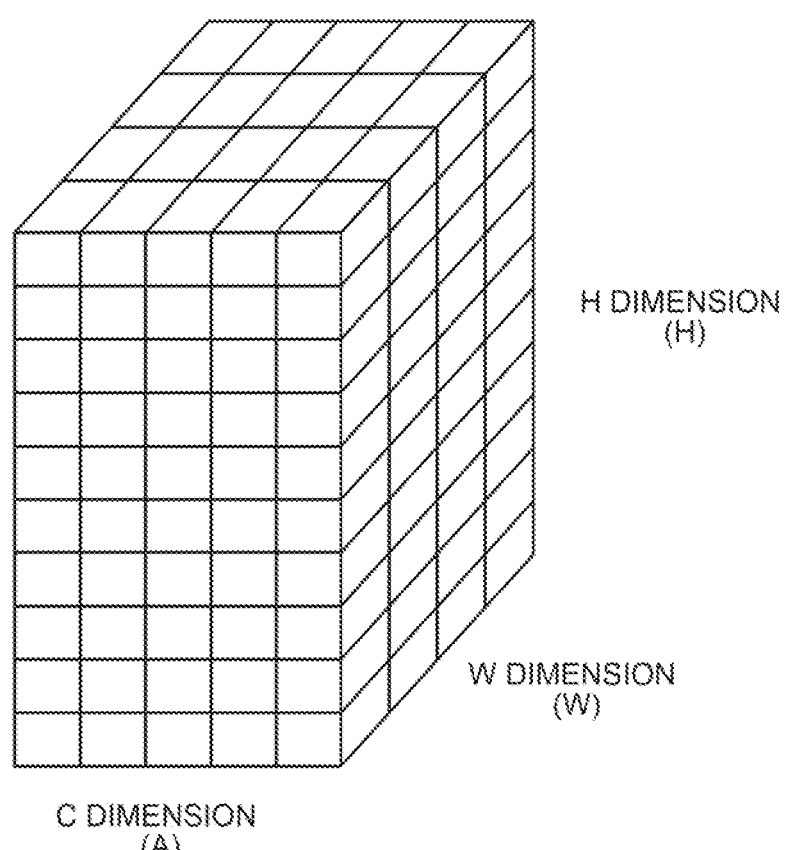
FIG. 2 It depicts a schematic diagram showing pre-convolution data.

Hereafter, this 3 dimensional data is referred to as pre-convolution data. FIG. 2 is a schematic diagram showing the pre-convolution data.

Figure 3:
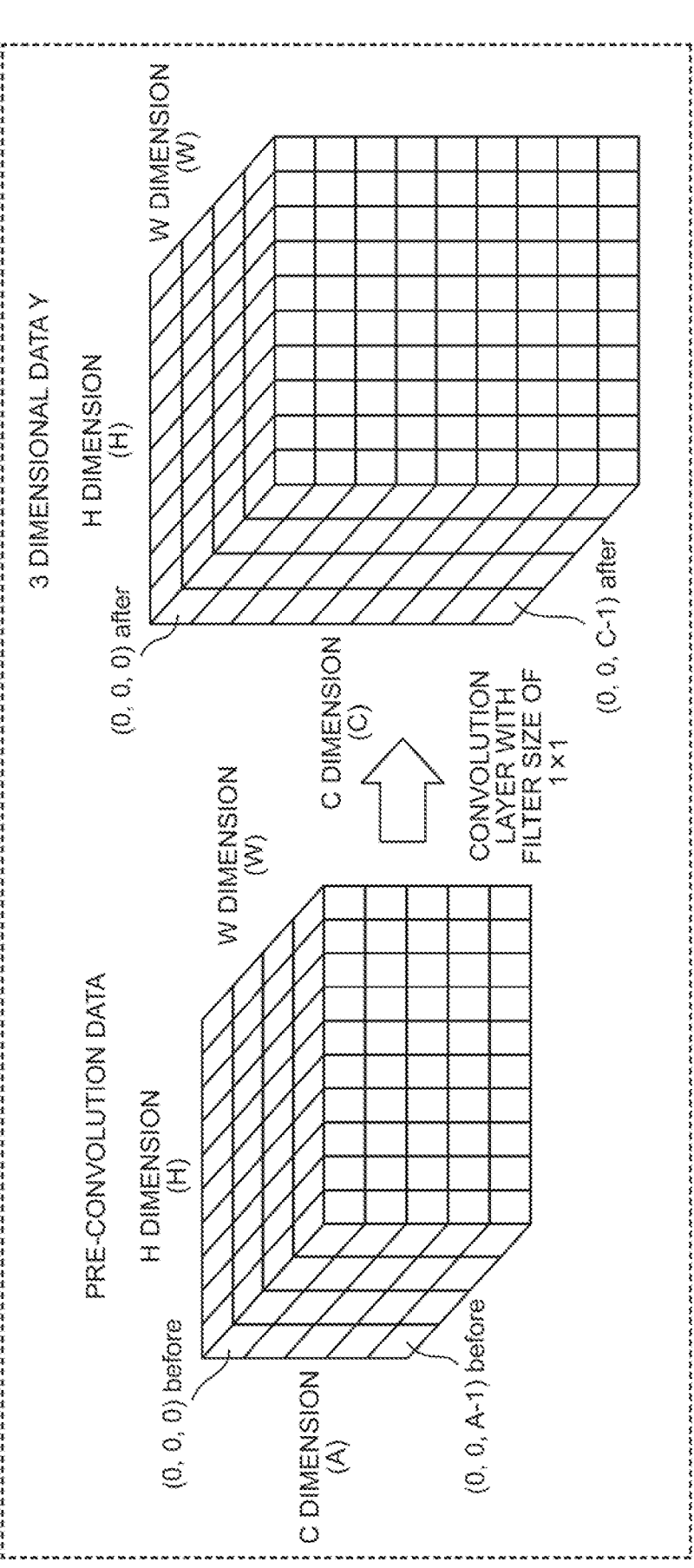
FIG. 3 It depicts a schematic diagram showing the pre-convolution data and 3 dimensional data obtained after the execution of the convolution layer process with a filter size of 1×1.

The convolution layer processing unit 6 performs a convolution layer process with a filter size of 1×1 on the pre-convolution data, thereby to generate 3 dimensional data in which the number of elements (A) in predetermined one dimension (C dimension) is restored to the original number of elements (C). The size of this 3 dimensional data is H×W×C. FIG. 3 is a schematic diagram showing the pre-convolution data and 3 dimensional data (hereinafter referred to as 3 dimensional data Y) obtained after the execution of the convolution layer process with the filter size of 1×1. In FIG. 3, the elements of C dimension are shown vertically aligned for convenience.

The elements in the 3 dimensional data can be specified by 3 dimension coordinates. In the pre-convolution data, the values of the elements specified by the H dimension coordinate h, the W dimension coordinate w, and the C dimension coordinate c are expressed as $(h, w, c)_{before}$. Similarly, in the 3 dimensional data Y, the values of the elements specified by the H dimension coordinate h, the W dimension coordinate w, and the C dimension coordinate c are expressed as $(h, W, C)_{after}$.

The size 1×1 filter values used by the convolution layer processing unit 6 are defined as C sets of A filter values as 1 set. That is, A×C filter values are determined. The A×C filter values are determined in advance by learning.

The 0th set of A filter values is used to calculate the value of each element of the 0th channel in the 3 dimensional data Y. Similarly, the i-th set of A filter values (i is an integer such that $0 \leq i \leq C-1$) is used to calculate the value of each element of the i-th channel in the 3 dimensional data Y.

For example, it is assumed that the 0th set of A filter values is $a_{(0, 0)}, a_{(0, 1)}, \ldots, a_{(0, A-1)}$, in order from the 0th. In this case, the convolution layer processing unit 6 calculates the value of $(0, 0, 0)_{after}$ by the following formula (1).

$$(0, 0, 0)_{after} = (0, 0, 0)_{before} \times a_{(0,0)} \qquad (1)$$

$$+ (0, 0, 1)_{before} \times a_{(0,1)}$$

$$+ (0, 0, 2)_{before} \times a_{(0,2)}$$

$$\cdots$$

$$+ (0, 0, A-1)_{before} \times a_{(0,A-1)}$$

The convolution layer processing unit 6 also obtains the values of the other elements of the 0th channel in the 3 dimensional data Y using the 0th set of A filter values by the similar calculation.

It is assumed that the i-th set of A filter values is $a_{(i,\ 0)}$, $a_{i,\ 1)}$, . . . , $a_{(i,\ A-1)}$, in order from the 0th. In this case, the convolution layer processing unit 6 calculates the value of $(0, 0, i)_{after}$ by the following formula (2).

$$(0, 0, i)_{after} = (0, 0, 0)_{before} \times a_{(i,0)} \qquad (2)$$
$$+(0, 0, 1)_{before} \times a_{(i,1)}$$
$$+(0, 0, 2)_{before} \times a_{(i,2)}$$
$$...$$
$$+(0, 0, A-1)_{before} \times a_{(i,A-1)}$$

The convolution layer processing unit 6 also obtains the values of the other elements of the i-th channel in the 3 dimensional data Y using the i-th set of A filter values by the similar calculation.

The convolution layer processing unit 6 uses the above calculation to calculate the value of each element of the 0th channel, the value of each element of the 1st channel, . . . , the value of each element of the C-1st channel in the 3 dimensional data Y. Then, the convolution layer processing unit 6 performs the same process for all positions in the plane consisting of the H dimension and W dimension in the pre-convolution data. In other words, the convolution layer processing unit 6 calculates the values of all elements in the 3 dimensional data Y. Then, the convolution layer processing unit 6 derives the 3 dimensional data Y. As a result, 3 dimensional data Y whose size is H×W×C is obtained.

The Sigmoid layer processing unit 7 applies a sigmoid function to the individual elements in the 3 dimensional data Y derived by the convolution layer processing unit 6. As a result, the value of each element in the 3 dimensional data changes to a value in the range of 0 to 1. The size of the 3 dimensional data is not changed by the processing by the Sigmoid layer processing unit 7. The 3 dimensional data after the processing by the Sigmoid layer processing unit 7 is denoted by the symbol Y'. The neural network processing device 1 may not include the Sigmoid layer processing unit 7, and the above processing by the Sigmoid layer processing unit 7 may be omitted. Also, instead of the Sigmoid layer processing unit 7, a component that applies a function other than the sigmoid function to individual elements in the 3 dimensional data Y may be included in the neural network processing device 1.

The A×C filter values (value of filter of filter size 1×1) used by the convolution layer processing unit 6 can also be referred to as weights. Then, it can be said that the calculation of C values from $(0, 0, 0)_{after}$ to $(0, 0, C-1)_{after}$ (see right side of FIG. 3) is the same as the process to obtain 1 dimensional data with C elements by obtaining the values of C elements in the second FC layer in the SE block (see step S104 in FIG. 8).

Therefore, the 3 dimensional data Y' obtained by the Sigmoid layer processing unit 7 is the same as the 3 dimensional data X' obtained by the copy process performed in the Scale layer of the SE block (see step S106 in FIG. 8).

Therefore, each element of each channel in the 3 dimensional data Y' is a coefficient that represents the degree of importance of the channel corresponding to that element (the channel of the 3 dimensional data U). For example, the values of the H×W elements in the 0th channel of the 3 dimensional data Y' are common, and are the coefficients representing the degree of importance of the 0th channel of the 3 dimensional data U.

The Scale layer processing unit 8 generates 3 dimensional data by performing an element-wise product operation of the first input 3 dimensional data U and the 3 dimensional data Y' obtained by the Sigmoid layer processing unit 7. The Scale layer processing unit 8 outputs the 3 dimensional data.

Figure 4:
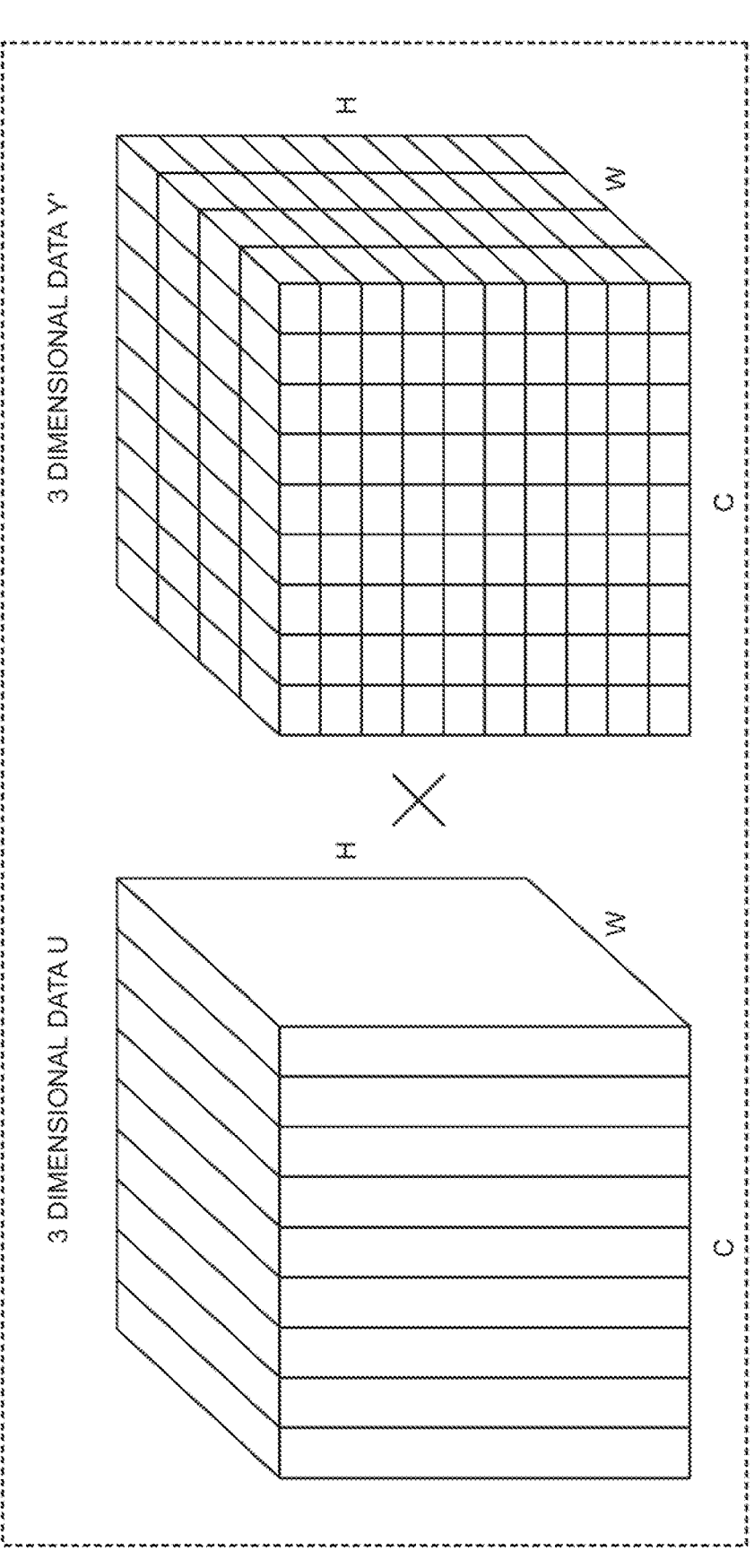
FIG. 4 It depicts a schematic diagram showing calculation of element-wise product of the 3 dimensional data U and the 3 dimensional data Y'.

FIG. 4 is a schematic diagram showing calculation of the element-wise product of the 3 dimensional data U and the 3 dimensional data Y' obtained by the Sigmoid layer processing unit 7. The sizes of both the 3 dimensional data U and 3 dimensional data Y' are H×W×C, and are common. Furthermore, the elements in the 3 dimensional data U and the elements in the 3 dimensional data Y' can both be specified by 3 dimension coordinates. Therefore, it is possible to associate elements in the 3 dimensional data U and elements in the 3 dimensional data Y' that share the same 3 dimension coordinates. As a result, the elements in the 3 dimensional data U and the elements in the 3 dimensional data Y' are associated one-to-one. The Scale layer processing unit 8 the generates 3 dimensional data by calculating the product of the values of elements for each pair of elements to be associated (in other words, by performing the element-wise product operation). The 3 dimensional data generated by the Scale layer processing unit 8 can be said to be the data obtained by multiplying the multiple elements for each individual channel of the 3 dimensional data U by the coefficient corresponding to the channel (coefficient representing the degree of importance).

The 1 dimensional data generation unit 2, the FC layer processing unit 3, the ReLU layer processing unit 4, the copy unit 5, the convolution layer processing unit 6, The Sigmoid layer processing unit 7 and the Scale layer processing unit 8 are realized, for example, by a CPU (Central Processing Unit) of a computer operating according to a neural network processing program. For example, the CPU may read the neural network processing program from a program storage medium such as a program storage device of the computer, and operate as the 1 dimensional data generation unit 2, the FC layer processing unit 3, the ReLU layer processing unit 4, the copy unit 5, the convolution layer processing unit 6, The Sigmoid layer processing unit 7 and the Scale layer processing unit 8 according to the neural network processing program.

Alternatively, the 1 dimensional data generation unit 2, the FC layer processing unit 3, the ReLU layer processing unit 4, the copy unit 5, the convolution layer processing unit 6, the Sigmoid layer processing unit 7, and the Scale layer processing unit 8 may each be realized by separate hardware.

Next, the processing flow will be described. FIG. 5 is a flowchart showing an example of the processing flow of the example embodiment of the present invention. In the following explanation, the case in which the input multidimensional data is the aforementioned 3 dimensional data U (see FIG. 9) will be used as an example. In addition, detailed explanations of matters already explained will be omitted.

When the 1 dimensional data generation unit 2 inputs of the 3 dimensional data U, the 1 dimensional data generation unit 2 generates the 1 dimensional data whose number of elements is the number of elements of the C dimension (C) in the 3 dimensional data U, by setting the number of elements of each dimension other than the C dimension (i.e., the H dimension and the W dimension) to 1 (step S1).

Next, the FC layer processing unit 3 reduces the number of elements in the 1 dimensional data obtained in step S1 by performing FC layer processing (step S2). It is assumed that the number of elements after the reduction is A. A<C.

Next, the ReLU layer processing unit 4 changes the values of the elements in the 1 dimensional data obtained in step S2 that have negative values to 0 (step S3). At this time, the ReLU layer processing unit 4 does not change the value of elements whose value is equal to or greater than 0.

Next, the copy unit 5 generates the pre-convolution data (see FIG. 2) whose size is H×W×A by copying the 1 dimensional data obtained in step S3 H×W times (Step S4).

Next, the convolution layer processing unit 6 performs convolution layer processing with a filter size of 1×1 on the pre-convolution data, thereby to generate 3 dimensional data Y in which the number of elements of the C dimension is restored to the original number of elements (C) (Step S5).

Next, the Sigmoid layer processing unit 7 derives the 3 dimensional data Y' by applying a sigmoid function to the individual elements in the 3 dimensional data Y (step S6). The value of each element included in the 3 dimensional data Y' is in the range of 0 to 1.

Next, the Scale layer processing unit 8 generates 3 dimensional data by performing the element-wise product operation of the first input 3 dimensional data U and the 3 dimensional data Y', and outputs the 3 dimensional data (Step S7).

Next, the effect of the present example embodiment is explained. As mentioned above, the 3 dimensional data Y' obtained by the Sigmoid layer processing unit 7 is the same as the 3 dimensional data X' obtained by the copy process performed in the Scale layer of the SE block (see step S106 in FIG. 8). Therefore, in the present example embodiment, the same result as in the SE block is obtained by the element-wise product operation in the Scale layer processing unit 8. Therefore, according to the neural network processing device of the present example embodiment, the same CNN accuracy as the SE block can be obtained.

In the present example embodiment, the copy unit 5 copies the 1 dimensional data derived by the ReLU layer processing unit 4 multiple times. The size of this 1 dimensional data is 1×1×A. Also, A<C. Therefore, the overhead of the copy process in the present example embodiment is smaller than the overhead of the copy process in the SE block, which copies 1 dimensional data whose size is 1×1×C multiple times. Therefore, according to the present example embodiment, the operation can be performed at a faster speed than in the SE block.

In other words, according to the present example embodiment, it is possible to obtain the same CNN accuracy as the SE block and perform operations faster than the SE block. As a result, processing time can be reduced.

Note that the convolution layer processing unit 6 performs convolution layer process with a filter size of 1×1 on the pre-convolution data, therefore the amount of operations required to obtain the 3 dimensional data Y is larger than the amount of operations of the second FC layer in the SE block (see step S104 in FIG. 8). However, the speed of the convolution layer process is fast. Therefore, even if the amount of operations performed by the convolution layer processing unit 6 in obtaining the 3 dimensional data Y is large, the effect on the processing speed (processing time) is small, and as a result, the processing speed can be faster than in the SE block.

In a neural network, a block is a batch of multiple layers which are basic components, and the block is applied multiple times. Then, steps S1-S7 (see FIG. 5) of the present example embodiment can be considered as one block. This block is denoted as block P. The block P can be applied in multiple location in the neural network process. Here, the degree of the effect of block P (the effect of the present example embodiment) varies depending on the size of the input multidimensional data. Therefore, in the neural network process, block P may be applied to the location where the effect of block P is large. In the neural network process, the location where the effect is large may be specified in advance by experimentation or other means.

Figures 6, 7:
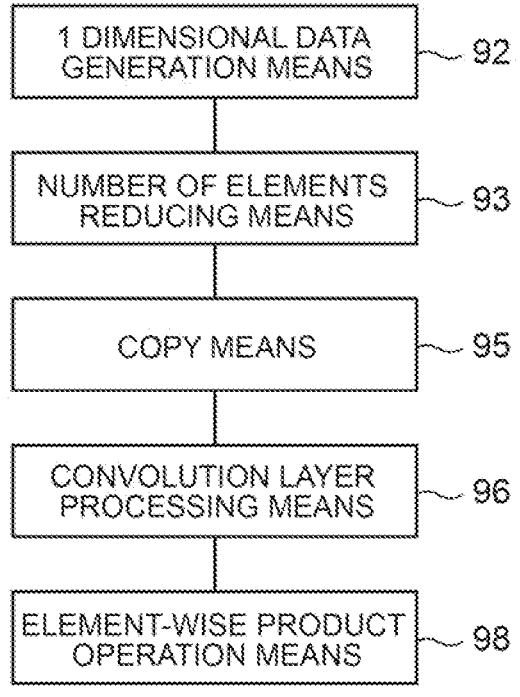
FIG. 6 It depicts a schematic block diagram showing an example of computer configuration related to the neural network processing device of the example embodiment of the present invention.
FIG. 7 It depicts a block diagram showing an overview of the neural network processing device of the present invention.

FIG. 6 is a schematic block diagram showing an example of computer configuration of the neural network processing device of the example embodiment of the present invention. The computer 1000 includes a CPU 1001, a main memory 1002, an auxiliary memory 1003, and an interface 1004.

The neural network processing device 1 of the example embodiment of the present invention is realized by a computer 1000. The operation of the neural network processing device 1 is stored in the auxiliary memory 1003 in the form of a neural network processing program. The CPU 1001 reads the neural network processing program from auxiliary memory 1003 and expands it to the main memory 1002, and executes the process described in the above example embodiment.

The auxiliary memory 1003 is an example of a non-transitory tangible medium. Other examples of non-transitory tangible media include magnetic disks connected via interface 1004, magneto-optical disks, CD-ROM (Compact Disk Read Only Memory), DVD-ROM (Digital Versatile Disk Read Only Memory), semiconductor memory, etc. When the program is delivered to the computer 1000 through a communication line, the computer 1000 may expand the program in the main memory 1002 and execute the process described in the above example embodiment according to the program.

Some or all of the components may be realized by general-purpose or dedicated circuitry, processor, or a combination of these. These may comprise a single chip or multiple chips connected via a bus. Some or all of the components may be realized by a combination of the above-mentioned circuitry, etc. and a program.

When some or all of components is realized by multiple information processing devices, circuits, etc., the multiple information processing devices, circuits, etc. may be centrally located or distributed. For example, the information processing devices and circuits may be realized as a client-and-server system, a cloud computing system, etc., each of which is connected via a communication network.

The following is an overview of the invention. FIG. 7 is a block diagram showing an overview of the neural network processing device of the present invention. The neural network processing device of the present invention includes 1 dimensional data generation means 92, number of elements reducing means 93, copy means 95, convolution layer processing means 96, and element-wise product operation means 98.

The 1 dimensional data generation means 92 (e.g., the 1 dimensional data generation unit 2) generates, by setting the number of elements of each dimension (e.g., the H dimension and the W dimension) other than predetermined one dimension (e.g., the C dimension (dimension of channel)) to 1 based on multidimensional data corresponding to one input data (e.g., the 3 dimensional data U), 1 dimensional data whose number of elements is the same as the number of elements of the predetermined one dimension in the multidimensional data (e.g., C).

The number of elements reducing means 93 (e.g., the FC layer processing unit 3) reduces the number of elements included in the 1 dimensional data.

The copy means 95 (e.g., the copy unit 5) copies the 1 dimensional data whose number of elements has been reduced multiple times, thereby to generate multidimensional data (e.g., pre-convolution data) in which the number of elements of each dimension (e.g., the H dimension and the W dimension) other than the predetermined one dimension is restored to original number of elements (e.g., H and W).

The convolution layer processing means 96 (e.g., convolution layer processing unit 6) performs a convolution layer process with a filter size of 1×1 on the multidimensional data generated by the copy means 95, thereby to generate multidimensional data in which the number of element of the predetermined one dimension (e.g., the C dimension) in multidimensional data generated by the copy means 95 is restored to original number of elements (e.g., C).

The element-wise product operation means 98 performs an element-wise product operation, based on the multidimensional data corresponding to one input data (e.g., the 3 dimensional data U) and the multidimensional data generated by the convolution layer processing means.

According to such a configuration, it is possible to obtain the same CNN accuracy as the SE block and perform operations faster than the SE block.

The neural network processing device may include sigmoid function processing means (e.g., the Sigmoid layer processing unit 7) for applying a sigmoid function to each element in the multidimensional data generated by the convolution layer processing means 96, and the element-wise product operation means 98 may perform the element-wise product operation of the multidimensional data corresponding to one input data and the multidimensional data after the sigmoid function is applied to each element.

The neural network processing device may include change means (e.g., the ReLU layer processing unit 4) for changing values of the elements in the 1 dimensional data whose number of elements has been reduced that have negative values to 0, and the copy means 95 may copy the 1 dimensional data after processing by the change means multiple times.

The multidimensional data corresponding to one input data may be 3 dimensional data, and the predetermined one dimension may be a dimension of channel.

Although the present invention has been described above with reference to example embodiment, the present invention is not limited to the above example embodiment. Various changes may be made to the structure and details of the present invention, that may be understood by those skilled in the art within the scope of the present invention.

INDUSTRIAL APPLICABILITY

The invention is suitable for a neural network processing device that performs a process of a neural network.

REFERENCE SIGNS LIST

1 Neural network processing device
2 1 dimensional data generation unit
3 FC layer processing unit
4 ReLU layer processing unit
5 Copy unit
6 Convolution layer processing unit
7 Sigmoid layer processing unit
8 Scale Layer processing unit

What is claimed is:

1. A multidimensional data processing device comprising:
a memory configured to store instructions; and
at least one processor configured to execute the instructions to:
generate by setting a number of elements of each dimension other than a predetermined one dimension to 1 based on multidimensional data corresponding to one input data, 1-dimensional data whose number of elements is the same as a number of elements of the predetermined one dimension in the multidimensional data;
reduce the number of elements included in the 1-dimensional data;
copy, multiple times, the 1-dimensional data whose number of elements has been reduced, thereby to generate second multidimensional data in which the number of elements of each dimension other than the predetermined one dimension is restored to original number of elements;
perform a convolution layer process with a filter size of 1×1 on the second multidimensional data, thereby to generate third multidimensional data in which the number of elements of the predetermined one dimension in the second multidimensional data is restored to original number of elements; and
perform an element-wise product operation, based on the multidimensional data corresponding to one input data and the third multidimensional data,
wherein a number of elements of the 1-dimensional data whose number of elements has been reduced and the number of elements of the predetermined one dimension in the second multidimensional data are the same, and
wherein when A denotes the number of elements of the 1-dimensional data whose number of elements has been reduced, i denotes an integer from 0 to A-1, each i-th element of the predetermined one dimension in the second multidimensional data is the same as i-th element of the predetermined one dimension in the 1-dimensional data whose number of elements has been reduced.

2. The multidimensional data processing device according to claim 1,
wherein the at least one processor is configured to apply a sigmoid function to each element in the third multidimensional data;
wherein the at least one processor is configured to perform the element-wise product operation of the multidimensional data corresponding to one input data and the third multidimensional data after the sigmoid function is applied to each element.

3. The multidimensional data processing device according to claim 1,
wherein the at least one processor is configured to change values of the elements in the 1-dimensional data whose number of elements has been reduced that have negative values to 0;
wherein the at least one processor is configured to copy the 1-dimensional data multiple times.

4. The multidimensional data processing device according to claim 1,
wherein the multidimensional data corresponding to one input data is 3 dimensional data, and,
the predetermined one dimension is a dimension of channel.

5. A multidimensional data processing method comprising:

generating, by setting a number of elements of each dimension other than a predetermined one dimension to 1 based on multidimensional data corresponding to one input data, 1-dimensional data whose number of elements is the same as a number of elements of the predetermined one dimension in the multidimensional data;

reducing the number of elements included in the 1-dimensional data;

executing a copy process of copying, multiple times, the 1-dimensional data whose number of elements has been reduced, thereby to generate second multidimensional data in which the number of elements of each dimension other than the predetermined one dimension is restored to original number of elements;

performing a convolution layer process with a filter size of 1×1 on the second multidimensional data generated by the copy process, thereby to generate third multidimensional data in which the number of elements of the predetermined one dimension in the second multidimensional data generated by the copy process is restored to original number of elements; and performing an element-wise product operation, based on the multidimensional data corresponding to one input data and the third multidimensional data whose number of elements in the predetermined one dimension is restored to original number of elements, wherein a number of elements of the 1-dimensional data whose number of elements has been reduced and the number of elements of the predetermined one dimension in the second multidimensional data are the same, and wherein when A denotes the number of elements of the 1-dimensional data whose number of elements has been reduced, i denotes an integer from 0 to A-1, each i-th element of the predetermined one dimension in the second multidimensional data is the same as i-th element of the predetermined one dimension in the 1-dimensional data whose number of elements has been reduced.

6. The multidimensional data processing method according to claim 5, further comprising:

applying a sigmoid function to each element in the third multidimensional data whose number of elements of the predetermined one dimension is restored to original number of elements, wherein performing the element-wise product operation includes performing the element-wise product operation of the multidimensional data corresponding to one input data and the third multidimensional data after the sigmoid function is applied to each element.

7. A non-transitory computer-readable recording medium in which a multidimensional data processing program is recorded, wherein the multidimensional data processing program causes a computer to execute:

a 1-dimensional data generation process of generating, by setting a number of elements of each dimension other than a predetermined one dimension to 1 based on multidimensional data corresponding to one input data, 1-dimensional data whose number of elements is the same as a number of elements of the predetermined one dimension in the multidimensional data;

a number of elements reducing process of reducing the number of elements included in the 1-dimensional data;

a copy process of copying, multiple times, the 1-dimensional data whose number of elements has been reduced, thereby to generate second multidimensional data in which the number of elements of each dimension other than the predetermined one dimension is restored to original number of elements;

a multidimensional data generation process of performing a convolution layer process with a filter size of 1×1 on the second multidimensional data generated by the copy process, thereby to generate third multidimensional data in which the number of elements of the predetermined one dimension in the second multidimensional data generated by the copy process is restored to original number of elements; and an element-wise product operation process of performing an element-wise product operation, based on the multidimensional data corresponding to one input data and the third multidimensional data generated by the multidimensional data generation process, wherein a number of elements of the 1-dimensional data whose number of elements has been reduced and the number of elements of the predetermined one dimension in the second multidimensional data are the same, and wherein when A denotes the number of elements of the 1-dimensional data whose number of elements has been reduced, i denotes an integer from 0 to A-1, each i-th element of the predetermined one dimension in the second multidimensional data is the same as i-th element of the predetermined one dimension in the 1-dimensional data whose number of elements has been reduced.

8. The non-transitory computer-readable recording medium in which the multidimensional data processing program is recorded according to claim 7, wherein the multidimensional data processing program causes the computer to execute:

a sigmoid function process of applying a sigmoid function to each element in the third multidimensional data generated by the multidimensional data generation process, wherein the multidimensional data processing program causes the computer to execute in the element-wise product operation process, performing the element-wise product operation of the multidimensional data corresponding to one input data and the third multidimensional data after the sigmoid function is applied to each element.

* * * * *